(12) United States Patent
Akerib

(10) Patent No.: US 11,520,791 B2
(45) Date of Patent: Dec. 6, 2022

(54) IN-MEMORY EFFICIENT MULTISTEP SEARCH

(71) Applicant: GSI Technology Inc., Sunnyvale, CA (US)

(72) Inventor: Avidan Akerib, Tel Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 0 days.

(21) Appl. No.: 16/867,607

(22) Filed: May 6, 2020

(65) Prior Publication Data

US 2020/0364228 A1 Nov. 19, 2020

Related U.S. Application Data

(60) Provisional application No. 62/849,913, filed on May 19, 2019.

(51) Int. Cl.
*G06F 7/00* (2006.01)
*G06F 16/2455* (2019.01)

(52) U.S. Cl.
CPC .............................. *G06F 16/24558* (2019.01)

(58) Field of Classification Search
CPC ........... G06F 16/24558; G06F 16/2462; G06F 19/705; G06F 19/22; G06F 16/2474; G06F 16/24568; G06F 16/907
See application file for complete search history.

(56) References Cited

U.S. PATENT DOCUMENTS

| 8,238,173 | B2 | 8/2012 | Akerib | |
|---|---|---|---|---|
| 9,767,169 | B1 * | 9/2017 | Paff | G06F 16/9038 |
| 9,859,005 | B2 | 1/2018 | Akerib | |
| 10,153,042 | B2 | 12/2018 | Ehrman | |
| 2004/0059721 | A1 * | 3/2004 | Patzer | G16B 50/00 |
| 2004/0083336 | A1 * | 4/2004 | Stark | G06F 16/90339 711/105 |
| 2017/0060438 | A1 * | 3/2017 | Igaue | G11C 15/04 |
| 2017/0316829 | A1 * | 11/2017 | Ehrman | G11C 7/18 |
| 2018/0081566 | A1 | 1/2018 | Ehrman | |

* cited by examiner

*Primary Examiner* — Mohammed R Uddin
(74) *Attorney, Agent, or Firm* — Heidi Brun Associates Ltd.

(57) ABSTRACT

A system for performing cascading search includes an associative memory array, a controller, a similarity search processor and an exact match processor. The associative memory array stores a plurality of multiportion data vectors stored in at least one column of the associative memory array. Each vector has a first portion and a second portion which are aligned to each other in the column. The controller controls the associative memory array to perform a similarity search of a similarity query on the first portion and an exact search of an exact query on the second portion. The similarity match processor generates a match row including match bit indications aligned with each similarity matched column. The match row indicates which columns have first portions which match to the similarity query. The exact match processor outputs exact match columns from among the similarity matched columns which have second portions which match the exact query.

14 Claims, 6 Drawing Sheets

IN-MEMORY EFFICIENT MULTISTEP SEARCH

CROSS REFERENCE TO RELATED APPLICATIONS

This application claims priority and benefit from U.S. provisional patent application 62/849,913, filed May 19, 2019, which is incorporated herein by reference.

FIELD OF THE INVENTION

The present invention relates to search in general and to an efficient method for searching data and metadata.

BACKGROUND OF THE INVENTION

The term 'search' has become ubiquitous with the advent of the internet and the development of search engines like Google, Bing and Duck Duck Go. These internet search engines take a text-based query and compare it to website content and metadata and return matches according to their own ranking systems. This type of keyword search is also known as exact search.

Although exact search may be the most common search type it is not the only type of search performed by computers. Network administrators are concerned about hackers compromising their communications and computer networks. Hackers may try to inject malicious code into the network through a vulnerability in a device or application on the network. By comparing injected code with known intrusion types, they can identify such malicious payloads and remove them from the network. Chemists may want to compare newly developed molecules with other known molecules to try to understand how they may react or dissolve. This type of search is known as a similarity search and may be based on artificial intelligence (AI) methods. Similarity search metrics may compare features present in a query molecular fingerprint and features present in a candidate molecular fingerprint. Examples of such metrics are a Tanimoto, a Hamming, an L1, an L2 or a Jaccard search. Chemistry often uses the Tanimoto metric to quantify similarity between molecular fingerprints.

Reference is now made to FIG. 1 which illustrates a multiportion vector 1 that is divided into two portions, a first portion 2 and a second portion 3. Multiportion vectors may comprise more than one type of data, so in the network administrator example, the first portion 2 may be a header that comprises addressing and transport information, and the second portion 3 may be a payload comprising files or other data. In the chemistry example, first portion 2 may comprise a molecular fingerprint and second portion 3 may comprise metadata or metadata pointers associated with the molecular fingerprint. First portion 2 may be of an equal or different size to second portion 3.

Given such multiportion vectors, searchers may utilize an iterative search that may use an initial search of one of the portions of a multiportion vector to form a target group. That target group may itself then be subsequently searched using the second portion of the multiportion vector. Such an iterative search is known as a multistage or cascading search, where search i gives its results to search i+1 and is a common and well-known task. Cascading search may be utilized in the previous network and chemistry examples, however, the type of search utilized, and the portion searched might be different. The similarity search may be against known malicious code or intrusion types. Subsequently, network administrators may perform an exact search of second portion 3, which in this case may be the header comprising address information, against known sources addresses of such hackers. In the chemistry example, a group of molecules may be found using a similarity search of first portion 2 which comprises a molecular fingerprint; a subsequent exact search on the similarity search results, for example a keyword search, may then be performed on metadata that is either in second portion 2 or retrieved from sources indicated by metadata pointers in second portion 2.

It will be appreciated that, in the network administrator example, the initial similarity search was performed on second portion 3 but in the chemistry example, the similarity search was performed on first portion 2.

Reference is now made to FIG. 2 and to FIG. 3. FIG. 2 illustrates a cascading search system 19 comprising a similarity searcher 8, a similarity search database 10, a search results database 12, an exact searcher 9, exact search data retriever 17, a retrieved data database 15, and an exact search source database 18; FIG. 3 illustrates the steps of an exact search performed as a second stage of a multistage search.

Search system 19 may perform a similarity search followed by an exact search. Initially, similarity searcher 8 performs a similarity search to find candidate vectors from similarity search database 10 that have similar data in one of their vector portions to the similarity search query. In the chemistry example, this may be a feature search of a molecular fingerprint. Similarity searcher 8 then outputs both portions of the similarity search result vectors, to results database 12.

Subsequently, search system 19 performs an exact search of the second portion 3 of the candidate vector, which, in the chemistry example, may contain related metadata or one or more pointers to sources of metadata.

In step 21 of FIG. 3, exact search data retriever 17 retrieves metadata pointers from the candidate vectors in search results database 12. In step 23, exact search data retriever 17 then uses these metadata pointers to retrieve the metadata itself from exact search source database(s) 18 and, in step 25, adds it to retrieved data database 15. Next, in step 27, exact searcher 9 performs an exact search on metadata in retrieved data database 15. Finally, in step 29, exact searcher 15 outputs the exact search results.

Each candidate in search result database 12 may contain multiple metadata pointers. As a result, exact search data retriever 17 may need to retrieve each metadata block individually from multiple exact search source databases 18 and add them to retrieve data database 15. Exact searcher 8 will then perform a search on each metadata block.

This entire metadata retrieval process is then repeated for each candidate in search result database 15 and for all associated metadata pointers.

SUMMARY OF THE PRESENT INVENTION

There is provided, in accordance with a preferred embodiment of the present invention, a system for performing cascading search includes an associative memory array, a controller, a similarity search processor and an exact match processor. The associative memory array stores a plurality of multiportion data vectors. Each multiportion data vector is stored in at least one column of the associative memory array and has a first portion and a second portion. The first portion and the second portion are aligned to each other in the at least one column. The controller controls the associative memory array to perform a similarity search of a similarity query on the first portion and an exact search of an exact query on the second portion. The similarity match processor generates a match row including match bit indications aligned with each similarity matched column. The match row indicates which columns have first portions which match to the similarity query. The exact match processor outputs exact match columns from among the similarity matched columns as indicated by the match row. The exact match columns have second portions which match the exact query.

Moreover, in accordance with a preferred embodiment of the present invention, the similarity match processor utilizes a similarity metric such as Tanimoto search, a Hamming search, an L1 search, an L2 search or a Jaccard search.

Further, in accordance with a preferred embodiment of the present invention, the exact match processor searches the match row for match bits indicating similarity matched columns.

Still further, in accordance with a preferred embodiment of the present invention, the controller produces a modified exact search query by appending a search bit to the exact search query in the same bit position and with the same bit value as match bits indicating similarity matched columns.

Moreover, in accordance with a preferred embodiment of the present invention, the first portion is a molecular fingerprint and the second portion is metadata associated with the molecular fingerprint, or, the first portion is a header containing source address data and the second portion is payload associated with the header, or the first portion is a fingerprint and the second portion is metadata associated with the fingerprint.

There is also provided, in accordance with a preferred embodiment of the present invention, a method for performing cascading search. The method includes storing a plurality of multiportion data vectors in an associative memory array, each the multiportion data vector stored in at least one column of the associative memory array and each the multiportion data vector having a first portion and a second portion, wherein the first portion and the second portion are aligned to each other in the at least one column, performing a similarity search of a similarity query on the first portion and an exact search of an exact query on the second portion, generating a match row including match bit indications aligned with each similarity matched column, the match row indicating which columns have first portions which match to the similarity query and searching the similarity matched columns as indicated by the match row for exact match columns which have match columns whose second portions match the exact query.

Moreover, the similarity search utilizes a similarity metric which is Tanimoto search, a Hamming search, an L1 search, an L2 search or a Jaccard search.

Further, in accordance with a preferred embodiment of the present invention, the method includes searching the match row for match bits indicating similarity matched columns.

Still further, in accordance with a preferred embodiment of the present invention, the method includes producing a modified exact search query by appending a search bit to the exact search query in the same bit position and with the same bit value as match bits indicating similarity matched columns.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
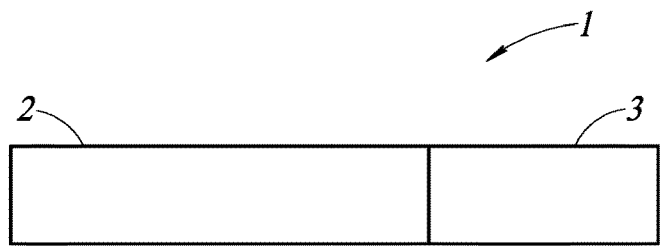
FIG. 1 is a schematic illustration of a multiportion vector.
Figure 2:
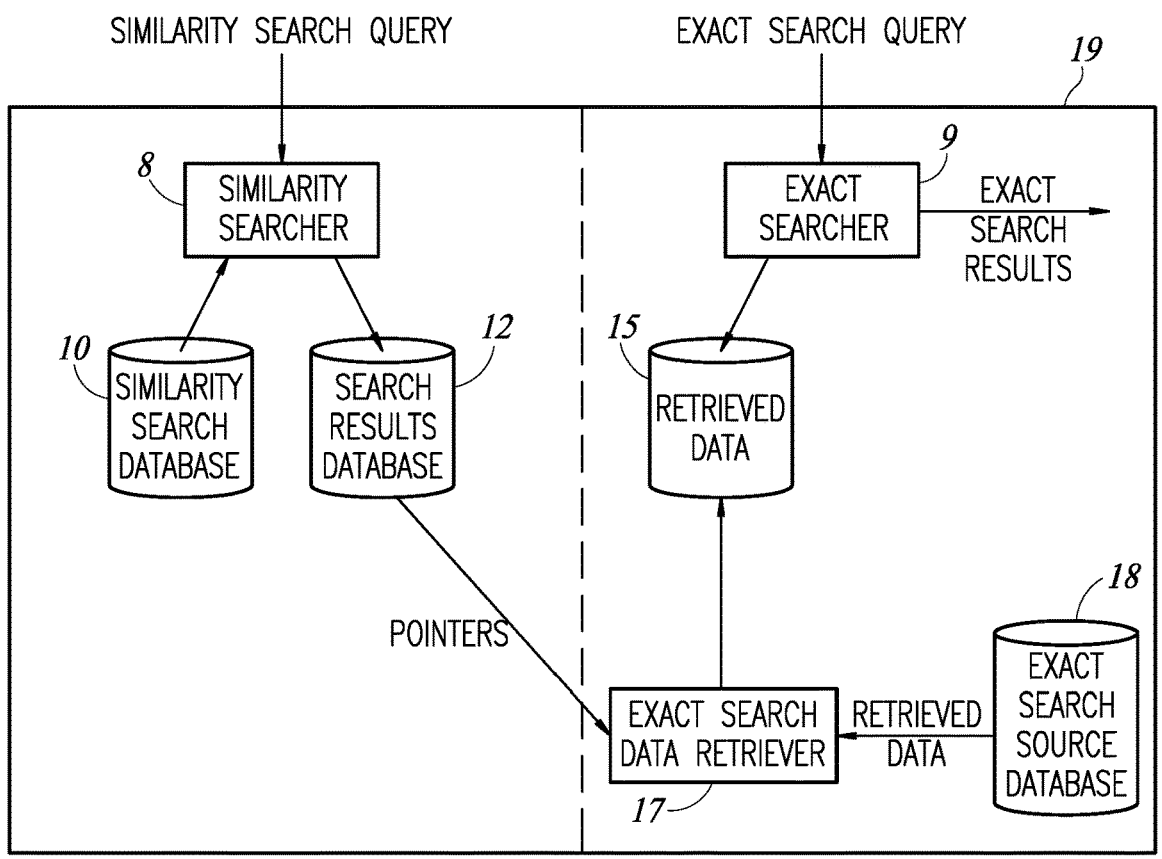
FIG. 2 is a schematic illustration of a prior art cascading search system.
Figure 3:
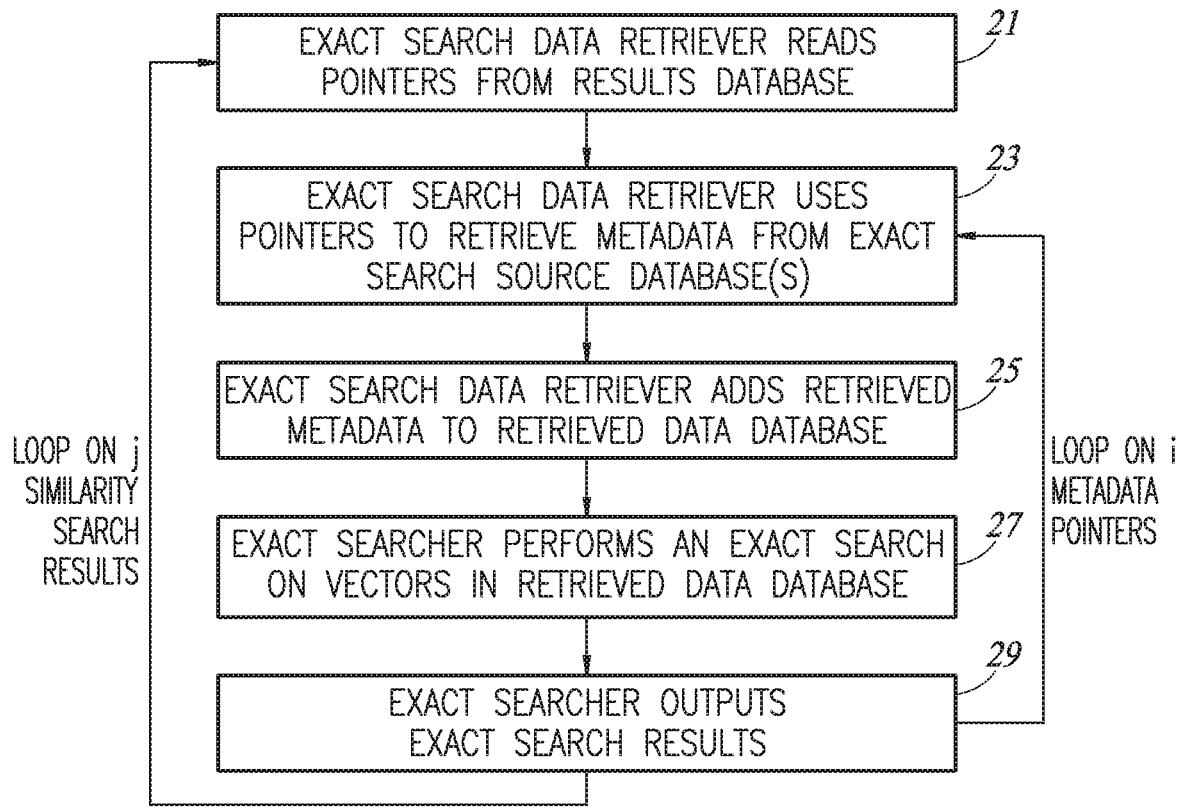
FIG. 3 is a flow chart illustration of a method of exact search.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that for cascading search, the initial similarity search, followed by the retrieval of metadata, followed by a second exact search of such metadata, is complex and computationally expensive.

Each cascading search may return a very large number of candidate vectors from its first similarity search. For each of those similarity match candidates, the search system has to find all metadata pointers in their metadata portions, find the indicated metadata source, download the metadata into memory, transfer the metadata to the search processor, perform the search and store the results. As a result, cascading searches are slow, expensive and difficult to do.

Applicant has further realized that efficient multistep searches of very large databases may be efficiently performed by using the associative memory storage and associative processing unit described in U.S. Pat. No. 8,238,173 (entitled "USING STORAGE CELLS TO PERFORM COMPUTATION") issued Aug. 7, 2012; U.S. Pat. No. 9,859,005 (entitled "MEMORY DEVICE") issued Jan. 2, 2018; U.S. Pat. No. 10,153,042 (entitled "IN-MEMORY COMPUTATIONAL DEVICE WITH BIT LINE PROCESSORS") issued Dec. 11, 2018; U.S. Pat. No. 10,929,751 (entitled "FINDING K EXTREME VALUES IN CONSTANT PROCESSING TIME") filed Jul. 13, 2017and issued Feb. 23, 2021, assigned to Applicant and incorporated herein by reference. Moreover, such searches may eliminate the input/output (IO) time from one type of search to the other, reducing search time by orders of magnitude.

Associative memory arrays store data in parallel columns. Associative memory computational units called associative processing units (APUs) can operate on all such columns simultaneously with a constant processing time, regardless of the number of columns. APUs can be utilized to perform simple Boolean logic functions and complex search functions on data in columns.

Figure 4:
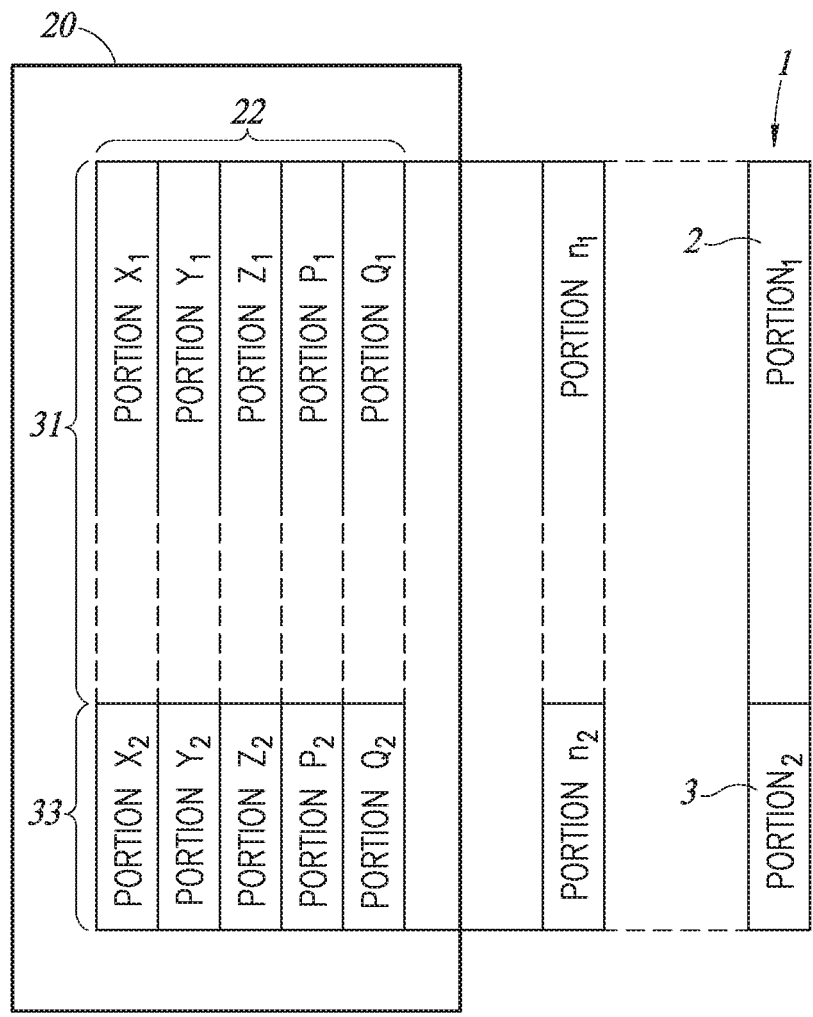
FIG. 4 is a schematic illustration of an associative memory array.

Reference is now made to FIG. 4 which is a schematic illustration of an associative memory array 20 containing a large plurality of data columns 22, where each column stores a multiportion data vector 1 comprising first portion 2 and second portion 3. Typically, one portion may be stored in one section 31 of associative memory array 20 while the associated second portion may be stored in a second section 33 of associative memory array 20. In a molecular example, first portion 2 might be a molecular fingerprint and second portion 3 might be metadata. In a network example, first portion 2 might be a packet payload while second portion 3 might be a packet header.

In accordance with a preferred embodiment of the present invention, both portions of multiportion vector 1 are aligned in the same column of associative memory array. In the example of FIG. 4, first portion 2 is stored in the upper section of the associative memory columns 22 and second portion 3 is in the lower section of associative memory columns 22.

Figure 5:
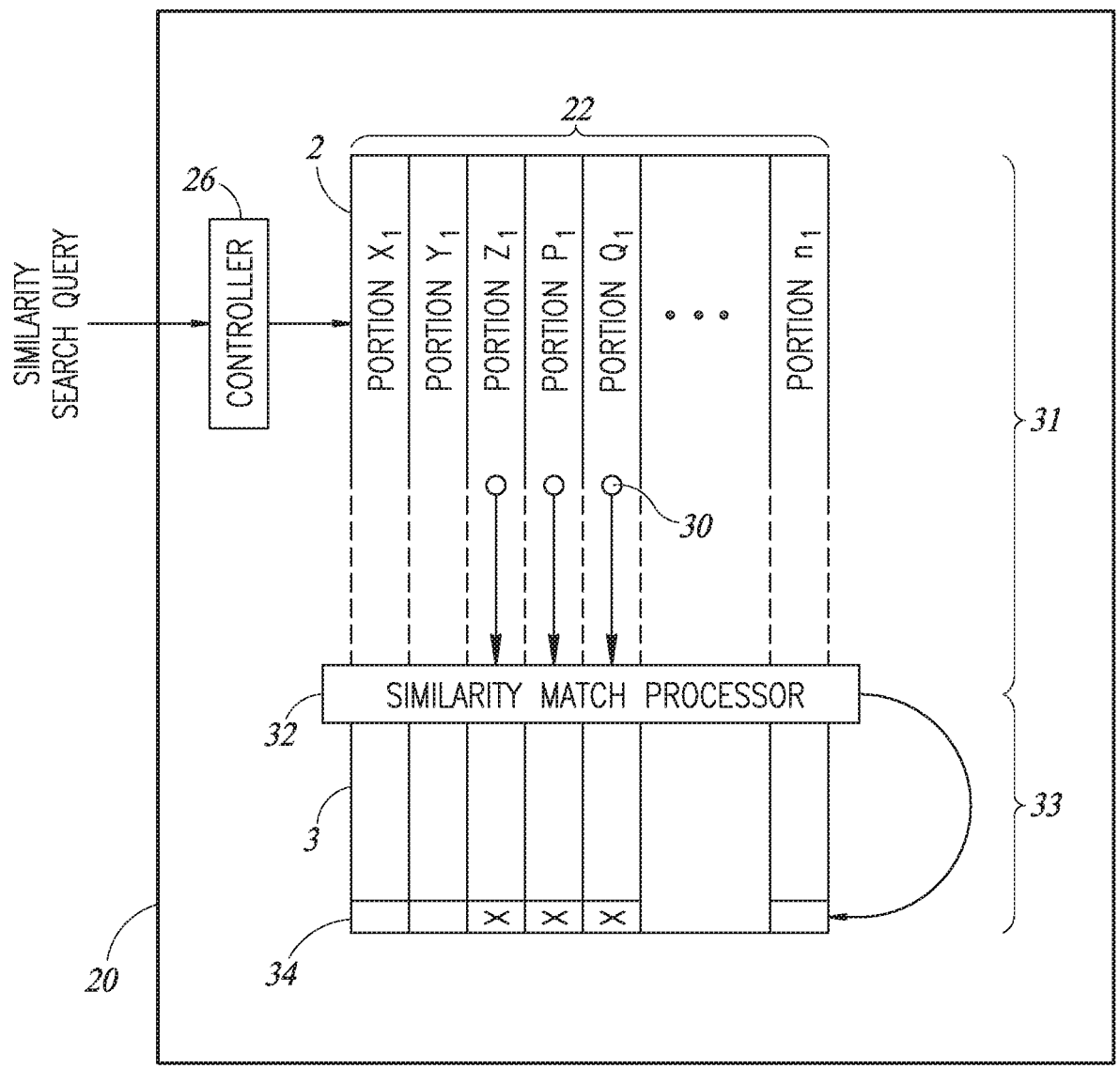
FIG. 5 is a schematic illustration of a similarity search system operative with the associative memory array of FIG. 4.
Figure 6:
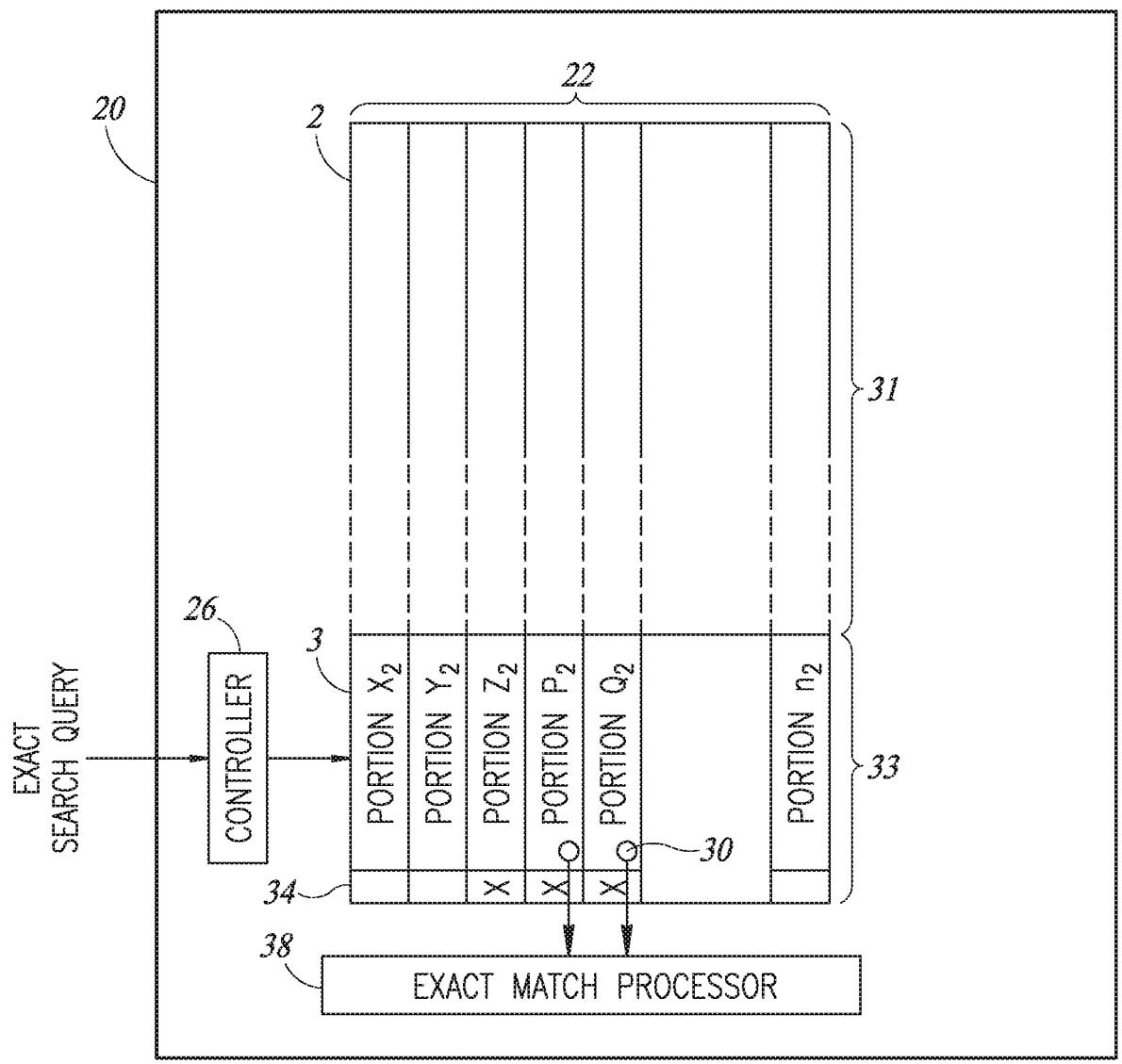
FIG. 6 is a schematic illustration of an exact search system operative with the associative memory array of FIG. 4.

Reference is now made to FIGS. 5 and 6 which, together, illustrate a multi-stage similarity search system implemented in associative memory array 20. The search system comprises a large plurality of data columns 22, a controller 26, a similarity match processor 32, an exact match processor 38 (detailed in FIG. 6) and a match row 34. Data portions 2 and 3 may be loaded as described hereinabove into memory columns 22. FIG. 6 details the exact search portion of the similarity search system and shows data columns 22, controller 26, exact match processor 38 and match row 34

First portions 2 and second portions 3 may be loaded as described hereinabove into memory columns 22. Similarity match processor 32 may receive a similarity search query and may perform a similarity search in parallel on columns 22, generating per-column match results containing bit indications of which columns were similarity matched and which were not similarity matched Similarity match processor 32 may write these results into match row 34 in the lower section of array 20. It will be appreciated that each bit indication in match row 34 may be aligned with the column with which it is associated.

Applicant has realized that, since first portions 2 are aligned with second portions 3, match row 34 can be written by similarity match processor 32 orders of magnitude faster than if they were not aligned.

Applicant has further realized that, since both portions of data vector 1 are aligned in the same associative memory column, parallel column search and writing match indications as described significantly reduces cascading search time.

As shown in FIG. 6, exact match processor 38 may receive an exact search query and may perform an exact search on only those vectors in associative memory columns 22 that have a match bit indication in match row 34. Exact match processor 38 then outputs exact match results.

Applicant has further realized that it is possible to restrict the exact search to columns that were similarity search matched by utilizing a modified metadata query 36 and match bit indications in match row 34.

Figure 7:
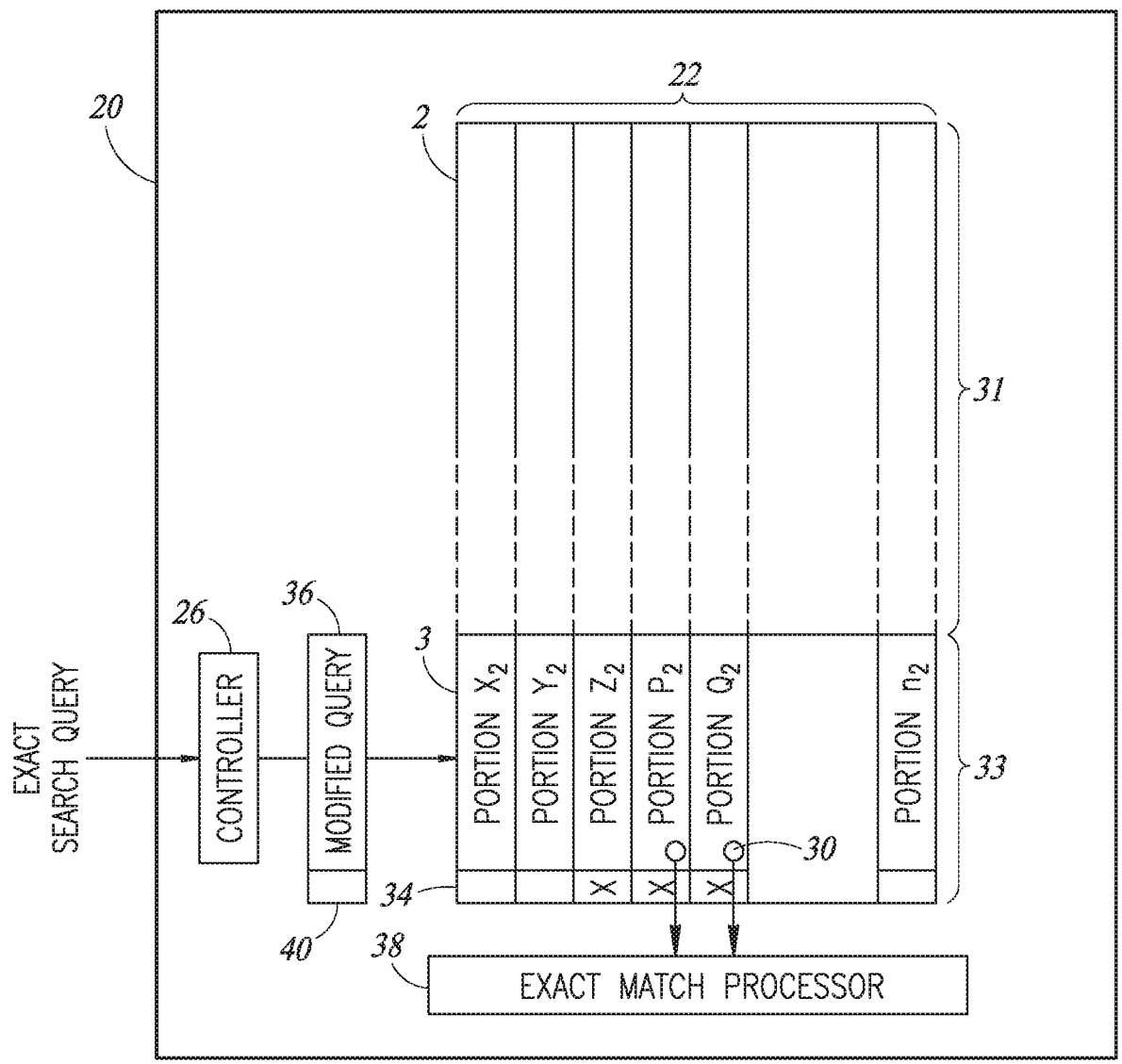
FIG. 7 is a schematic illustration of an alternative embodiment of the exact search system of FIG. 6 utilizing a modified search query.

In this alternative embodiment, shown in FIG. 7 to which reference is now made, controller 26 may append a search bit 40 to the exact search query. Search bit 40 may have the same bit value as match bit 34 and may be located in the same bit location as match row 34 appended to second portion 3 of multiportion vector 1 in associative memory array column 22.

For example, if search bit 40 is positioned as the least significant bit (LSB) of the exact search query and match row 34 is positioned as the LSB of second portion 3 of the multiportion candidate vector 1, then exact match processor 38 may utilize search bit 40 as the LSB portion of a modified exact search query against the combination of the lower section of data columns 22 and match row 34. It will be appreciated that, by appending search bit 40, only columns with match bit indications in match row 34 may be matched by exact match processor 38.

It will be further appreciated that when searching a large plurality, such as $32k$ or $64k$, of candidate vectors, restricting the subsequent exact search to only those similarity matched vectors utilizing a modified search query may further reduce the time of the subsequent exact search.

It will be further appreciated that, as all metadata for all candidate vectors has been preloaded and aligned, multiple, individual cascading searches can be performed very quickly without the need to stop and download metadata associated with matched first search results, between the first and second searches.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for performing cascading search, the system comprising;
    an associative memory array having columns separated into a first section of each column and a second section of each column, said associative memory array storing a plurality of multiportion data vectors, each said multiportion data vector stored in a separate column and having a first portion stored in said first section of said separate column and a second portion stored in said second section of said separate column;
    a controller controlling said associative memory array to perform a similarity search of a similarity query in said first section of each column and an exact search of an exact query in said second section of each column;
    a similarity match processor to generate a match row in said associative memory array comprising match bit indications aligned with each similarity matched column, said match row indicating which columns have first portions which match to said similarity query; and
    an exact match processor to output exact match columns from among said similarity matched columns as indicated by said match row, said exact match columns have second portions which match said exact query.

2. The system according to claim 1 wherein said similarity match processor utilizes a similarity metric which is one of: Tanimoto search, a Hamming search, an L1 search, an L2 search and a Jaccard search.

3. The system according to claim 1 wherein said exact match processor to search said match row for match bits indicating similarity matched columns.

4. The system according to claim 1 wherein said controller to produce a modified exact search query by appending a search bit to said exact search query in the same bit position and with the same bit value as match bits indicating similarity matched columns.

5. The system according to claim 1 wherein said first portion is a molecular fingerprint and said second portion is metadata associated with said molecular fingerprint.

6. The system according to claim 1 wherein said first portion is a header containing source address data and said second portion is payload associated with said header.

7. The system according to claim 1 wherein said first portion is a fingerprint and said second portion is metadata associated with said fingerprint.

8. A method for performing cascading search, the method comprising;
   in an associative memory array, having columns separated into a first section of each column and a second section of each column, said associative memory array storing a plurality of multiportion data vectors, each said multiportion data vector stored in a separate column and having a first portion stored in said first section of said separate column and a second portion stored in said second section of said separate column;
   performing a similarity search of a similarity query in said first section of each column and an exact search of an exact query in said second section of each column;
   generating a match row in said associative memory array comprising match bit indications aligned with each similarity matched column, said match row indicating which columns have first portions which match to said similarity query; and
   searching said similarity matched columns as indicated by said match row for exact match columns which have match columns whose second portions match said exact query.

9. The method according to claim 8 wherein said similarity search utilizes a similarity metric which is one of: Tanimoto search, a Hamming search, an L1 search, an L2 search and a Jaccard search.

10. The method according to claim 8 and comprising searching said match row for match bits indicating similarity matched columns.

11. The method according to claim 8 and also comprising producing a modified exact search query by appending a search bit to said exact search query in the same bit position and with the same bit value as match bits indicating similarity matched columns.

12. The method according to claim 8 wherein said first portion is a molecular fingerprint and said second portion is metadata associated with said molecular fingerprint.

13. The method according to claim 8 wherein said first portion is a header containing source address data and said second portion is payload associated with said header.

14. The method according to claim 8 wherein said first portion is a fingerprint and said second portion is metadata associated with said fingerprint.

\* \* \* \* \*